(12) United States Patent
Banks

(10) Patent No.: US 11,454,289 B2
(45) Date of Patent: Sep. 27, 2022

(54) UNITARY BRACKET FOR MOUNTING A BRAKE ASSEMBLY AND BRAKE ACTUATOR

(71) Applicant: Bendix Spicer Foundation Brake LLC, Elyria, OH (US)

(72) Inventor: Daniel E. Banks, Climax, MI (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 330 days.

(21) Appl. No.: 16/797,017

(22) Filed: Feb. 21, 2020

(65) Prior Publication Data
US 2021/0262536 A1 Aug. 26, 2021

(51) Int. Cl.
*F16D 51/22* (2006.01)
*F16D 51/20* (2006.01)
(Continued)

(52) U.S. Cl.
CPC .............. *F16D 51/20* (2013.01); *B33Y 10/00* (2014.12); *B33Y 50/00* (2014.12); *B33Y 80/00* (2014.12); *F16D 65/09* (2013.01); *F16D 65/22* (2013.01); *F16D 2051/003* (2013.01); *F16D 2121/08* (2013.01); *F16D 2125/30* (2013.01); *F16D 2250/00* (2013.01)

(58) Field of Classification Search
CPC ......... B33Y 50/00; B33Y 80/00; F16D 51/20; F16D 65/09; F16D 65/22; F16D 2051/003; F16D 2121/08; F16D 2125/30; F16D 2250/00; F16D 51/22
See application file for complete search history.

(56) References Cited

U.S. PATENT DOCUMENTS

| 3,076,531 A | 2/1963 | Hanley et al. |
| 3,497,037 A | 2/1970 | Deibel |

(Continued)

FOREIGN PATENT DOCUMENTS

| CN | 201350896 Y | 11/2009 |
| CN | 201507583 U | 6/2010 |

(Continued)

OTHER PUBLICATIONS

English (Machine) Translation of CN 201350896 Y.
(Continued)

*Primary Examiner* — Thomas W Irvin
(74) *Attorney, Agent, or Firm* — Reising Ethington P.C.

(57) ABSTRACT

A bracket for a brake assembly and a brake actuator includes a unitary body including a tube configured to receive a camshaft of the brake assembly and an actuator mounting arm disposed proximate a first end of the tube and configured to receive the brake actuator. In some embodiments, the tube includes one or more helical ribs formed on a radially inner surface. The bracket further includes either a brake spider or a brake spider mounting flange disposed proximate a second end of the tube. In either embodiment, material may be omitted in various locations to reduce the weight of the bracket. The bracket may be formed through an additive manufacturing process and in a manner that achieve at least one of a predetermined torsional stiffness and attenuation of a predetermined natural frequency.

19 Claims, 9 Drawing Sheets

(51) Int. Cl.

| | | |
|---|---|---|
| *F16D 65/09* | (2006.01) | |
| *F16D 65/22* | (2006.01) | |
| *B33Y 10/00* | (2015.01) | |
| *B33Y 50/00* | (2015.01) | |
| *B33Y 80/00* | (2015.01) | |
| *F16D 125/30* | (2012.01) | |
| *F16D 51/00* | (2006.01) | |
| *F16D 121/08* | (2012.01) | |

(56) References Cited

U.S. PATENT DOCUMENTS

| | | | |
|---|---|---|---|
| 4,727,964 A | 3/1988 | Weber et al. | |
| 7,975,812 B2 | 7/2011 | Gonska et al. | |
| 8,127,903 B2 | 3/2012 | Scheckelhoff et al. | |
| 9,303,703 B2 * | 4/2016 | Banks | F16D 65/0056 |
| 9,327,363 B2 | 5/2016 | Moss | |
| 9,574,626 B1 | 2/2017 | Berwanger | |
| 10,428,887 B2 * | 10/2019 | Berwanger | F16D 51/22 |
| 10,738,851 B2 * | 8/2020 | Smith | F16D 65/0068 |
| 11,313,426 B2 * | 4/2022 | Smith | F16D 65/0068 |
| 2014/0144739 A1 | 5/2014 | Galazin et al. | |
| 2014/0246280 A1 | 9/2014 | Jones et al. | |
| 2014/0345994 A1 | 11/2014 | Varela et al. | |
| 2016/0010709 A1 * | 1/2016 | Banks | F16D 65/60 188/234 |
| 2018/0119762 A1 * | 5/2018 | Smith | F16D 65/0068 |
| 2018/0142746 A1 * | 5/2018 | Hodgkins | F16D 55/22 |
| 2018/0223924 A1 * | 8/2018 | Piccoli | F16D 65/0075 |
| 2019/0024739 A1 * | 1/2019 | Berwanger | F16D 65/10 |
| 2021/0262537 A1 * | 8/2021 | Banks | F16D 51/22 |

FOREIGN PATENT DOCUMENTS

| | | |
|---|---|---|
| CN | 201842086 U | 5/2011 |
| CN | 201991973 U | 9/2011 |
| CN | 202193074 U | 4/2012 |
| CN | 202806735 U | 3/2013 |
| CN | 202914594 U | 5/2013 |
| CN | 203189573 U | 9/2013 |
| CN | 103738334 A | 4/2014 |
| CN | 204403244 U | 6/2015 |
| CN | 204821545 U | 12/2015 |
| CN | 205533896 U | 8/2016 |
| CN | 104455102 B | 8/2017 |
| CN | 206691258 U | 12/2017 |
| CN | 207246287 U | 4/2018 |
| CN | 207579856 U | 7/2018 |
| CN | 207795918 U | 8/2018 |
| CN | 108506379 A | 9/2018 |
| CN | 207893020 U | 9/2018 |
| WO | 20160154007 A1 | 9/2016 |

OTHER PUBLICATIONS

English (Machine) Translation of CN 201507583 U.
English (Machine) Translation of CN 201842086 U.
English (Machine) Translation of CN 201991973 U.
English (Machine) Translation of CN 202193074 U.
English (Machine) Translation of CN 202806735 U.
English Abstract of CN 202914594 U.
English (Machine) Translation of CN 203189573 U.
English (Machine) Translation of CN 103738334 A.
English (Machine) Translation of CN 204403244 U.
English (Machine) Translation of CN 204821545 U.
English (Machine) Translation of CN 205533896 U.
English (Machine) Translation of CN 104455102 B.
English (Machine) Translation of CN 206691258 U.
English (Machine) Translation of CN 207246287 U.
English (Machine) Translation of CN 207579856 U.
English (Machine) Translation of CN 207795918 U.
English (Machine) Translation of CN 108506379 A.
English (Machine) Translation of CN 207893020 U.
WIPO Global Design Database Entry for CN 302253816 S.
English (Machine) Translation of "description of the characteristic features of the design(s), or matter for which protection is not sought" from WIPO Global Design Database Entry for CN 302253816S.
WIPO Global Design Database Entry for CN 303189799 S.
English (Machine) Translation of "description of the characteristic features of the design(s), or matter for which protection is not sought" from WIPO Global Design Database Entry for CN 303189799 S.
WIPO Global Design Database Entry for CN 303452557 S.
English (Machine) Translation of "description of the characteristic features of the design(s), or matter for which protection is not sought" from WIPO Global Design Database Entry for CN 303452557 S.

* cited by examiner

UNITARY BRACKET FOR MOUNTING A BRAKE ASSEMBLY AND BRAKE ACTUATOR

BACKGROUND OF THE INVENTION a. Field of the Invention

This invention relates to vehicle brakes. In particular, the invention relates to a bracket for mounting a brake assembly and a brake actuator that provides improved performance while reducing the cost of manufacture and vehicle assembly and also allowing improved control of torsional stiffness and noise attenuation.

b. Background Art

In a conventional drum brake, a brake drum rotates with a wheel or wheels proximate to one end of an axle. The drum defines a radially inner braking surface. A brake spider is disposed about the axle and a pair of brake shoes are pivotally mounted at one end to the brake spider. The opposite end of each brake shoe is engaged by an actuating member such as a cam to move the brake shoes between positions of engagement and disengagement with the braking surface of the brake drum. The cam is driven by a brake actuator acting on one end of a camshaft supporting the cam.

Referring to FIGS. 1-2, in one conventional drum brake, a bracket assembly 10 supports various components of a brake assembly 12 and a brake actuator 14 and positions them relative to one another. The bracket assembly 10 includes a tube 16 through which the camshaft 18 extends and a mounting arm 20 and mounting flange 22 welded to either end of the tube 16 and configured for coupling to the brake actuator 14 and a brake spider 24, respectively. A support 26 is often installed between the vehicle axle 28 and the tube 16 and a gusset 30 is often installed between the tube 16 and arm 20 in order to reduce stress on welds within assembly 10 and to reinforce arm 20.

The above-described design for the bracket assembly 10 has several drawbacks. Support 26 adds weight to the vehicle, requires welding to the axle 28 and is generally difficult and costly to assemble. The welded joints between the tube 16, mounting arm 20 and mounting flange 22 are subject to failure and can result in misalignment of components. Assembly 10 is also relatively heavy and costly to manufacture—requiring relatively costly tooling. Further, traditional manufacturing methods for assembly 10 limit flexibility in accommodating different application requirements including loads, mounting hole patterns, available space, varying camshaft lengths and varying brake actuator positions as well as addressing noise and vibration from natural frequencies of the assembly 10. Traditional manufacturing methods for assembly 10 also make it difficult to establish a desired torsional stiffness (particularly among bracket assemblies of different lengths) thereby requiring slack adjusters between the actuator 14 and camshaft to accommodate large ranges of deflection and making it difficult to set a proper running clearance between the brake shoes and brake drum.

The inventor herein has recognized a need for a bracket for mounting a brake assembly and a brake actuator that will minimize and/or eliminate one or more of the above-identified deficiencies.

BRIEF SUMMARY OF THE INVENTION

This invention relates to vehicle brakes. In particular, the invention relates to a bracket for mounting a brake assembly and a brake actuator that provides improved performance while reducing the cost of manufacture and vehicle assembly and also allowing improved control of torsional stiffness and noise attenuation.

A bracket for mounting a brake assembly and a brake actuator in accordance with one embodiment includes a unitary body including a tube configured to receive a camshaft of the brake assembly. The body further includes an actuator mounting arm disposed proximate a first end of the tube. The actuator mounting arm is configured to receive the brake actuator. The body further includes a brake spider mounting flange disposed proximate a second end of the tube. The brake spider mounting flange is configured to receive a brake spider of the brake assembly. A radially inner surface of the tube defines at least one radially inwardly projecting helical rib.

A bracket for mounting a brake assembly and a brake actuator in accordance with another embodiment includes a unitary body including a tube configured to receive a camshaft of the brake assembly. The body further includes an actuator mounting arm disposed proximate a first end of the tube. The actuator mounting arm is configured to receive the brake actuator. The body further includes a brake spider mounting flange disposed proximate a second end of the tube. The brake spider mounting flange is configured to receive a brake spider of the brake assembly. The brake spider mounting flange includes at least one weight reduction opening extending from a first side of the brake spider mounting flange facing the brake spider to a second side of the brake spider mounting flange facing away from the brake spider. The at least one weight reduction opening is configured to remain empty following assembly of the brake spider to the brake spider mounting flange.

A bracket for mounting a brake assembly and a brake actuator in accordance with another embodiment includes a unitary body including a tube configured to receive a camshaft of the brake assembly. The body further includes an actuator mounting arm disposed proximate a first end of the tube. The actuator mounting arm is configured to receive the brake actuator. The body further includes a brake spider disposed proximate a second end of the tube. The brake spider defines a central aperture configured to receive an axle and is configured to support a pair of brake shoes for a drum brake. A radially inner surface of the tube defines at least one radially inwardly projecting helical rib.

A bracket for mounting a brake assembly and a brake actuator in accordance with another embodiment includes a unitary body including a tube configured to receive a camshaft of the brake assembly. The body further includes an actuator mounting arm disposed proximate a first end of the tube. The actuator mounting arm is configured to receive the brake actuator. The body further includes a brake spider disposed proximate a second end of the tube. The brake spider defines a central aperture configured to receive an axle and is configured to support a pair of brake shoes for a drum brake. The body further includes at least one gusset extending between a radially outer surface of the tube and an inboard surface of the brake spider. The at least one gusset includes at least one weight reduction opening extending therethrough.

A method of manufacturing a bracket for mounting a brake assembly and a brake actuator in accordance with one embodiment includes the steps of creating a three-dimensional model of the bracket, converting the three-dimensional model into program instructions for an additive manufacturing machine, and successively depositing layers of material, responsive to the program instructions, using the additive manufacturing machine to form the bracket. The bracket includes a unitary body defining a tube configured to receive a camshaft of the brake assembly and an actuator mounting arm disposed proximate a first end of the tube. The actuator mounting arm is configured to receive the brake actuator.

A method of manufacturing a plurality of different bracket assemblies for mounting a brake assembly and a brake actuator includes the steps of creating three-dimensional models of a first bracket having a first length and a second bracket having a second length different than the first length, converting the three-dimensional models into program instructions for an additive manufacturing machine, and successively depositing layers of material, responsive to the program instructions, using the additive manufacturing machine to form the first bracket and the second bracket. Each of the first bracket and the second bracket include a unitary body defining a tube configured to receive a camshaft of the brake assembly and an actuator mounting arm disposed proximate a first end of the tube. The actuator mounting arm is configured to receive the brake actuator. The first bracket and the second bracket are configured to have the same torsional stiffness.

A bracket for mounting a brake assembly and a brake actuator in accordance with the invention represents an improvement as compared to conventional bracket assemblies. In particular, the absence of welds and other joints enables use of the bracket without supports extending between the axle and bracket thereby simplifying vehicle assembly and reducing costs. The absence of welds and other joints also reduces potential failures in the bracket and misalignment of brake components. The bracket can also be made with lighter materials and without costly tooling. The bracket can also be manufactured in a manner that provides flexibility in accommodating different application requirements including loads, mounting hole patterns, available space, varying camshaft lengths and varying brake actuator positions as well as in addressing noise and vibration from natural frequencies of the assembly. The bracket can also be manufactured in a manner that establishes a desired torsional stiffness (particularly among brackets of different lengths) thereby reducing the requirements on slack adjusters to accommodate large ranges of deflection and making it easier to set a proper running clearance between the brake shoes and brake drum.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
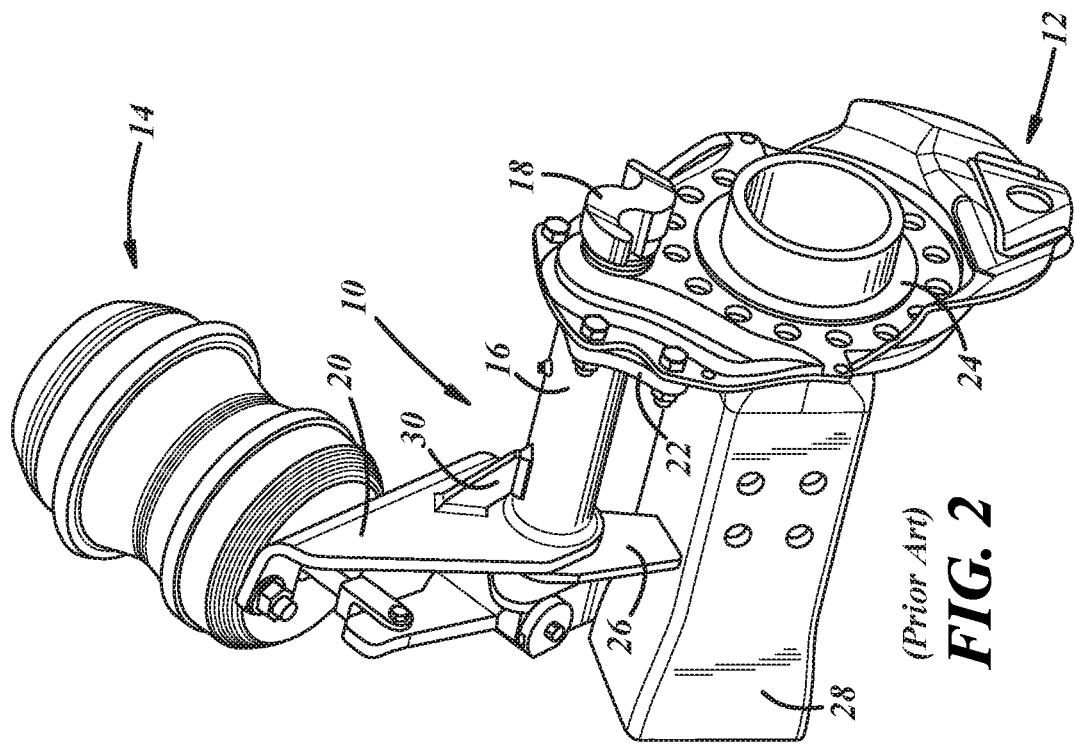
FIGS. 1-2 are perspective views of a prior art bracket assembly for mounting a brake assembly and a brake actuator.
Figure 2:
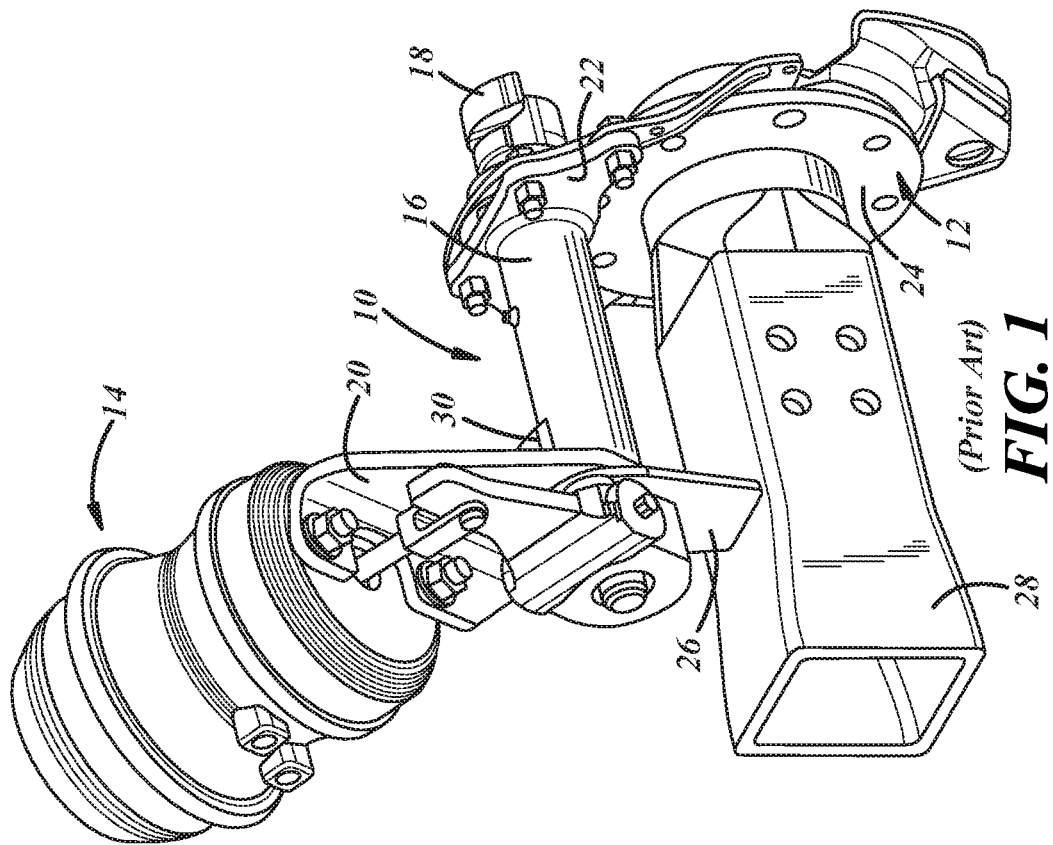
Figure 3:
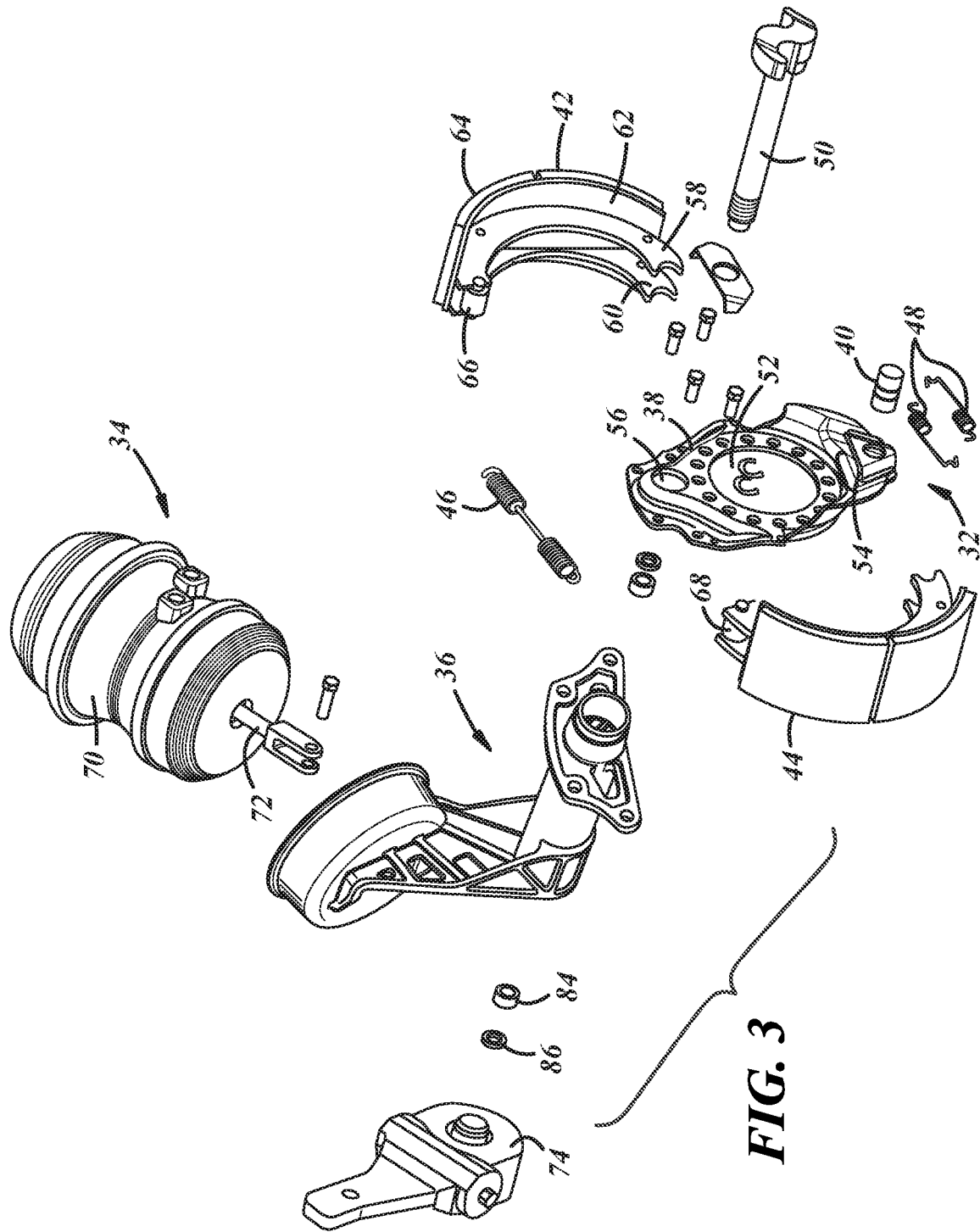
FIG. 3 is an exploded perspective view of a brake assembly, a brake actuator and a bracket for mounting the brake assembly and brake actuator in accordance with one embodiment of the present teachings.

Referring now to the drawings wherein like reference numerals are used to identify identical components in the various views, FIG. 3 illustrates a brake 32, a brake actuating means 34 and a bracket 36 for mounting the brake 32 and brake actuating means 34 in accordance with one embodiment of the present invention.

Brake 32 is provided to halt rotation of one or more vehicle wheels. Brake 32 is particularly adapted for use in heavy vehicles. It should be understood, however, that brake 32 may be used on a wide variety of vehicles and in non-vehicular applications. Brake 32 is configured to act against an annular brake drum (not shown) that rotates with the vehicle wheel or wheels at one end of an axle (not shown). Brake 32 may include a brake spider 38, an anchor pin 40, brake shoes 42, 44, return and retaining springs 46, 48, and a camshaft 50.

Spider 38 is provided to mount the various components of brake 32. Spider 38 defines a central aperture 52 through which the vehicle axle may extend. Spider 38 may further define bores 54, 56, on either side of aperture 52 configured to receive anchor pin 40 and camshaft 50.

Anchor pin 40 is provided to pivotally mount brake shoes 42, 44 to brake spider 38. Anchor pin 40 may comprise a round pin and may be received within bore 54 of spider 38. Although only one anchor pin 40 is shown in the illustrated embodiment, it should be understood that brakes shoes 42, 44 may be pivotally mounted to two separate anchor pins 40.

Brake shoes 42, 44 are provided for selective engagement with a braking surface of a drum (not shown) in order to apply a braking torque to the drum and one or more vehicle wheels. Each brake shoe 42, 44 may include a pair of spaced webs 58, 60, a brake table 62, and one or more brake linings 64. Webs 58, 60 support brake table 62 and may extend generally parallel to one another. Webs 58, 60 may be made from metals and metal alloys such as steel. Webs 58, 60 are arcuate in shape and extend between opposite ends of brake shoes 42, 44. Webs 58, 60 may be secured to brake table 62 using welds or other conventional fastening means. Each web 58, 60 may define semicircular recesses at either end configured to receive pin 40 and a corresponding one of cam followers 66, 68. Webs 58, 60 may also provide a connection point for return spring 46 and retaining springs 48. Brake table 62 is provided to support brake linings 64. Table 62 may be made from conventional metals and metal alloys including steel and may be arcuate in shape. Brake linings 64 are provided for frictional engagement with the braking surface of the drum. Linings 64 may be made from conventional friction materials. Brake linings 64 may be secured to brake table 62 using a plurality of rivets or other conventional fasteners.

Return spring 46 is provided to bias brake shoes 42, 44 to a position of disengagement from the braking surface. Retainer springs 48 are provided to retain brake shoes 42, 44—and particularly webs 58, 60—on anchor pin 40. Springs 46, 48 are conventional in the art. The ends of springs 46, 48 extend through corresponding apertures in webs 58, 60 of brake shoes 42, 44.

Camshaft 50 is provided to cause movement of brake shoes 42, 44 between positions of engagement with and disengagement from the braking surface of the drum. In the illustrated embodiment, camshaft 50 includes a conventional doubled lobed S-cam actuator. Cam followers 66, 68 follow the surface of the cam as it rotates thereby causing shoes 42, 44 to pivot about an axis defined by anchor pin 40. The opposite end of camshaft 50 is configured for coupling to brake actuating means 34.

Brake actuating means 34 is provided to cause rotation of camshaft 50 in order to apply or release brake 32. Actuating means 34 is conventional in the art and may include a brake actuator 70 having a pushrod 72 extending from a fluid chamber. Pushrod 72 is configured to engage a conventional slack adjuster 74 coupled to one end of camshaft 50. Fluid flow within the chamber of actuator 70 is controlled to cause linear movement of pushrod 72 which is translated into rotational movement of camshaft 50 by slack adjuster 74 to apply and release brake 32.

Figure 4:
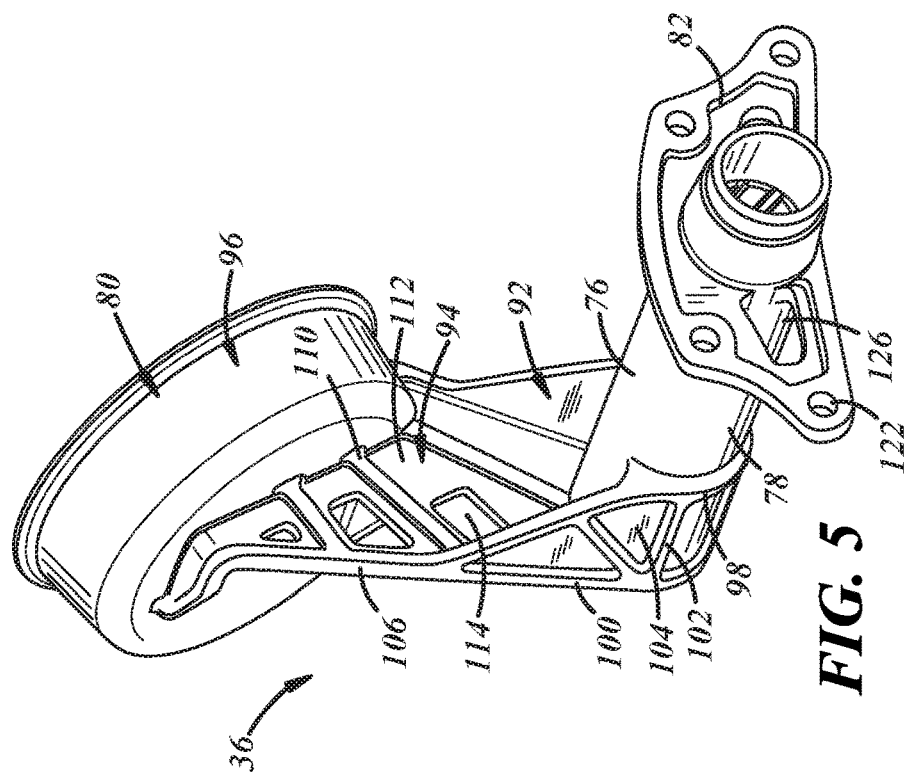
FIGS. 4-6 are perspective views of a bracket for mounting the brake assembly and brake actuator in accordance with one embodiment of the present teachings.
Figure 5:
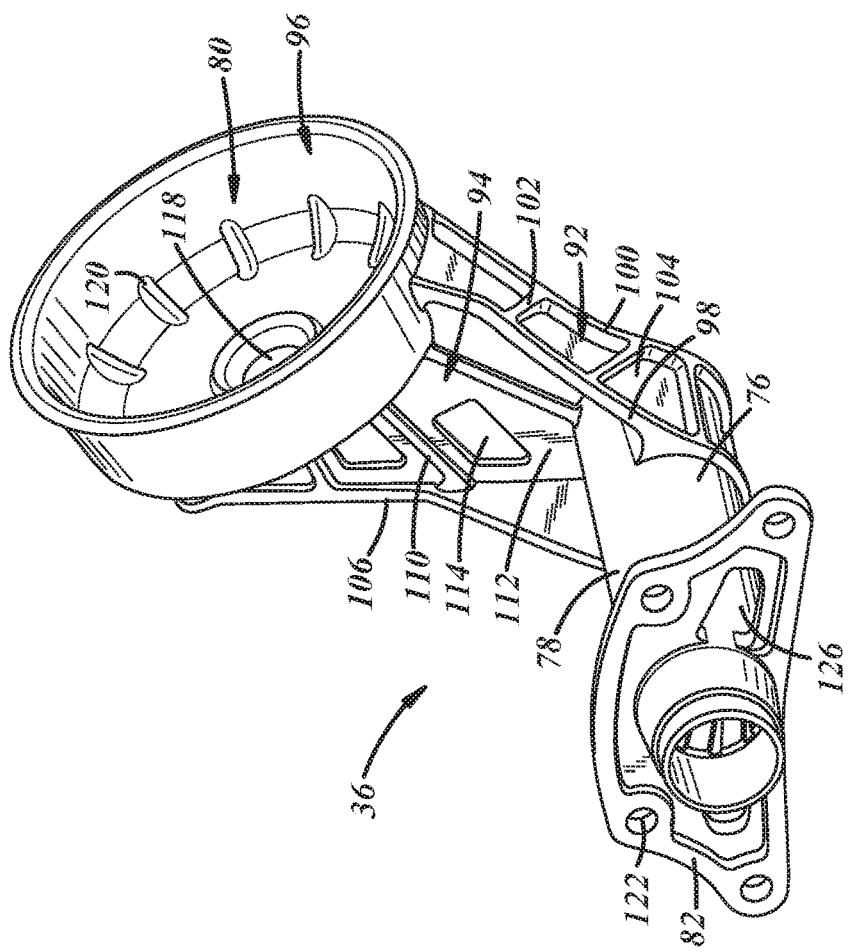
Figure 6:
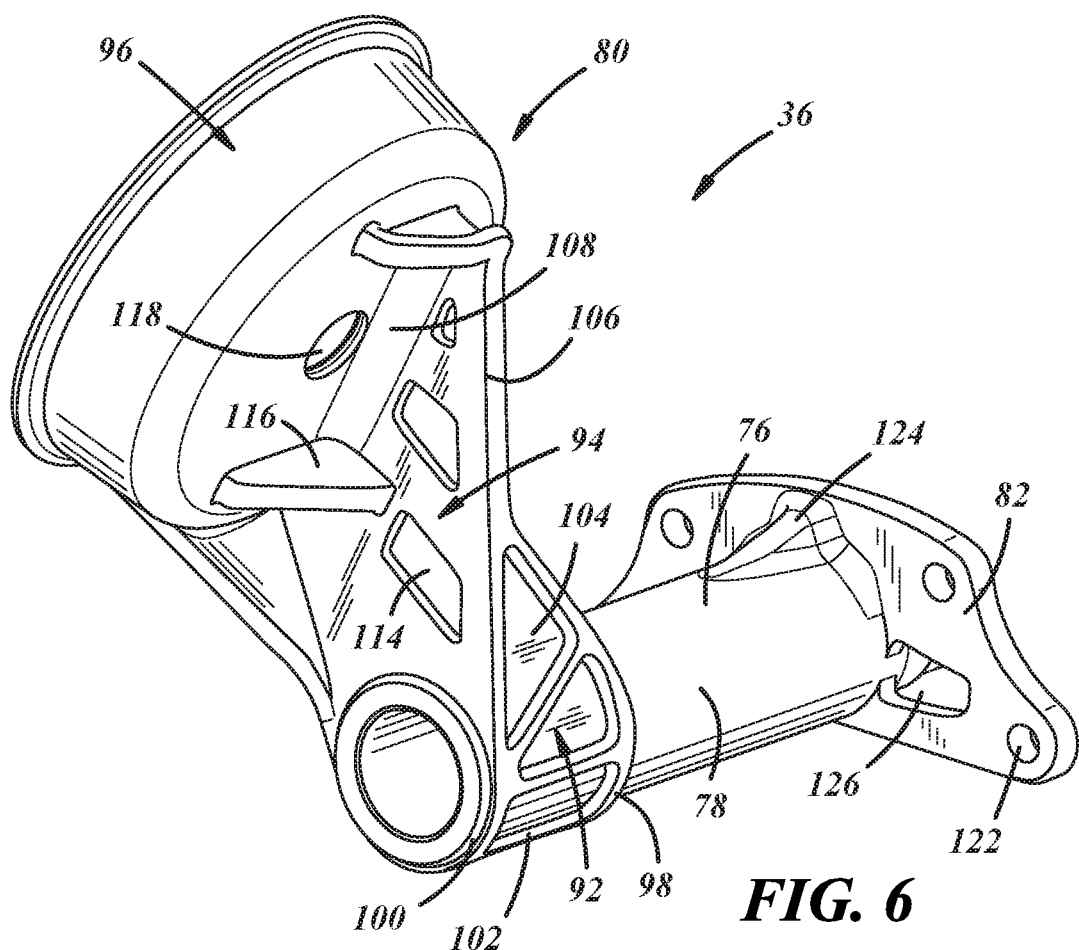

Bracket 36 is provided to mount brake 32 and brake actuator 70 and position brake 32 and actuator 70 relative to one another. Referring now to FIGS. 4-6, in accordance with one aspect of the present teachings, bracket 36 has a unitary or one-piece body 76 such the body 76 is formed without any welds, adhesives, fasteners or other coupling means between portions of body 76. Body 76 may be made from conventional metals and metal alloys. Body 76 defines a camshaft tube 78, an actuator mounting arm 80 and a brake spider mounting flange 82.

Figure 7:
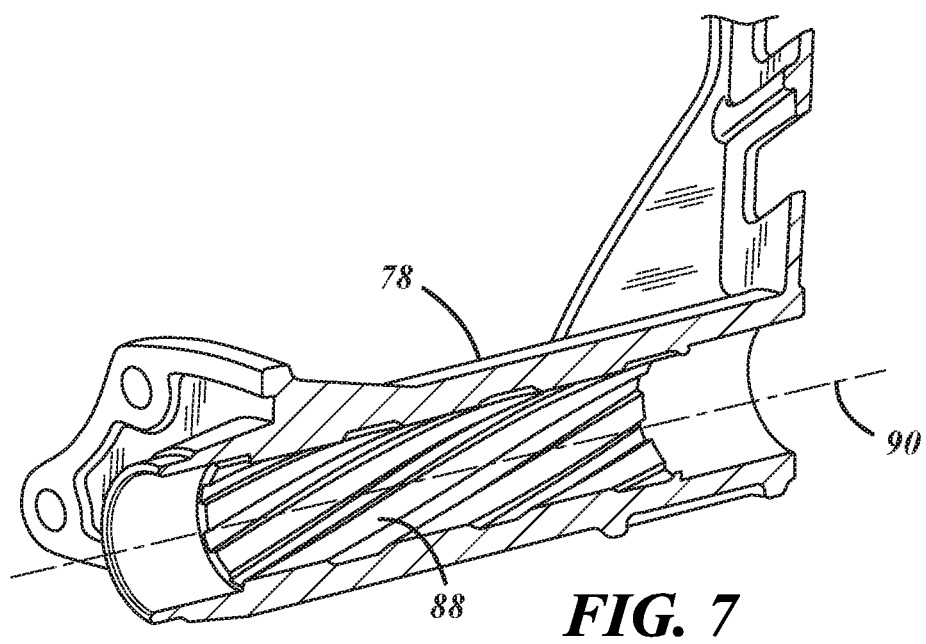
FIG. 7 is a cross-sectional view of a portion of the bracket of FIGS. 4-6.
Figure 8:
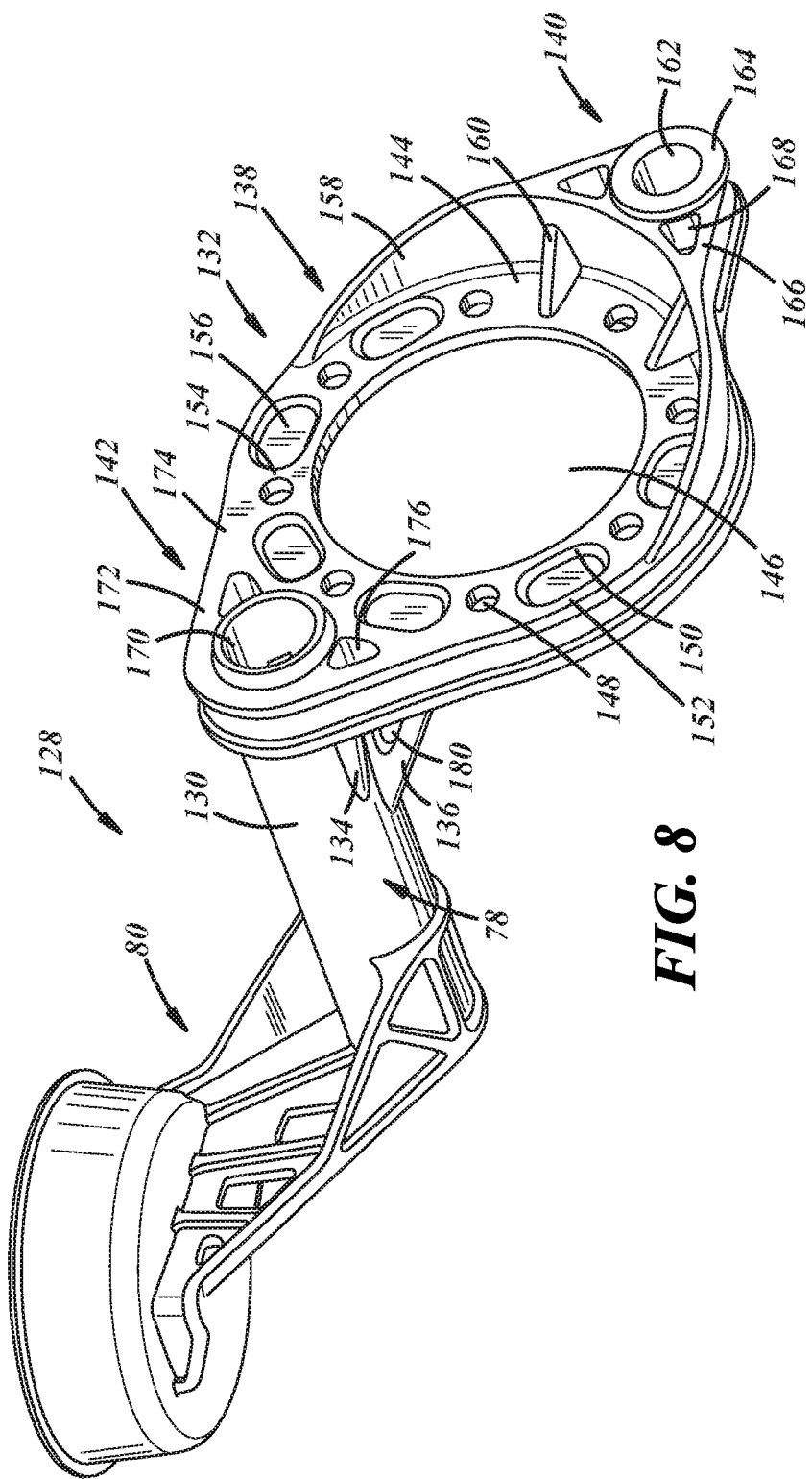
FIGS. 8-11 are perspective views of a bracket for mounting the brake assembly and brake actuator in accordance with another embodiment of the present teachings.
Figure 9:
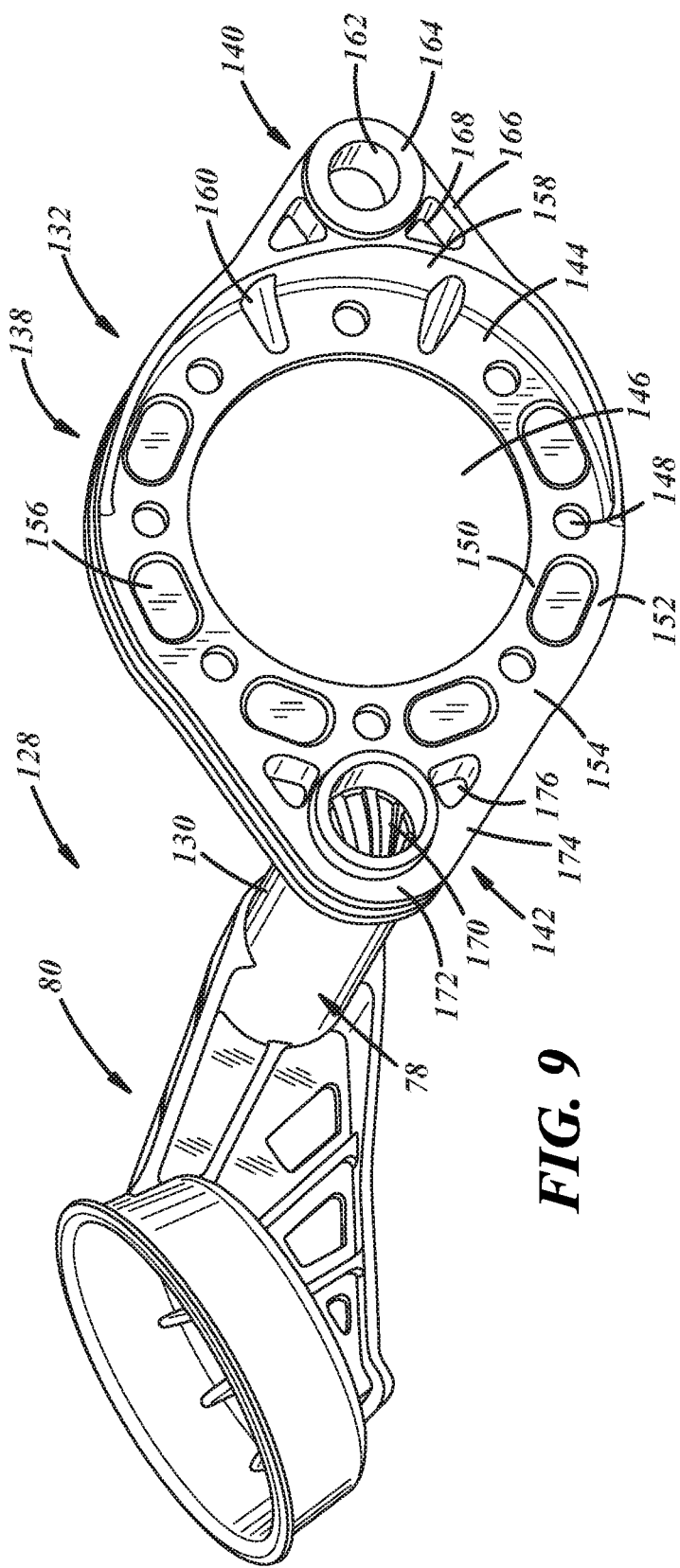
Figure 10:
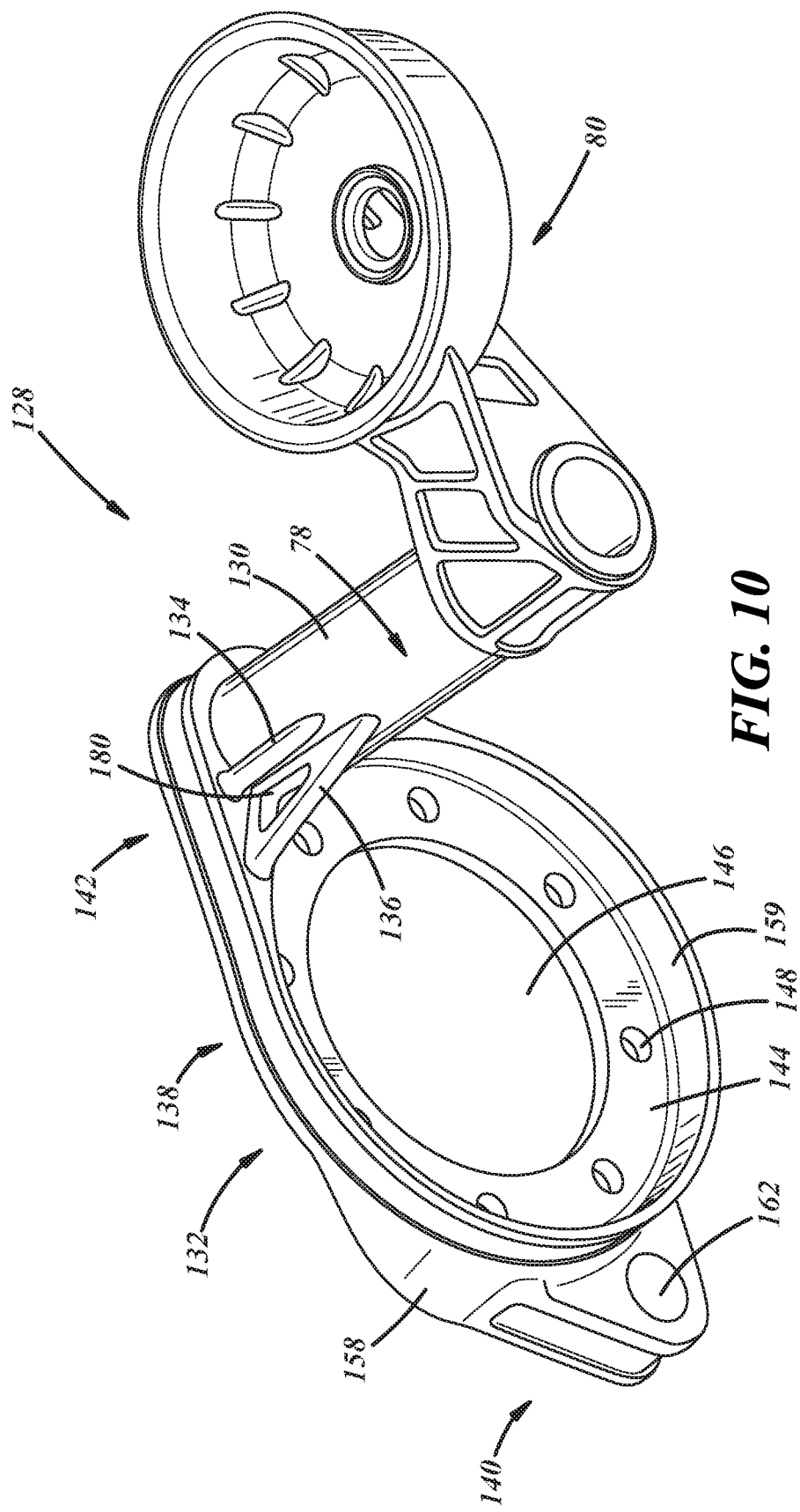
Figure 11:
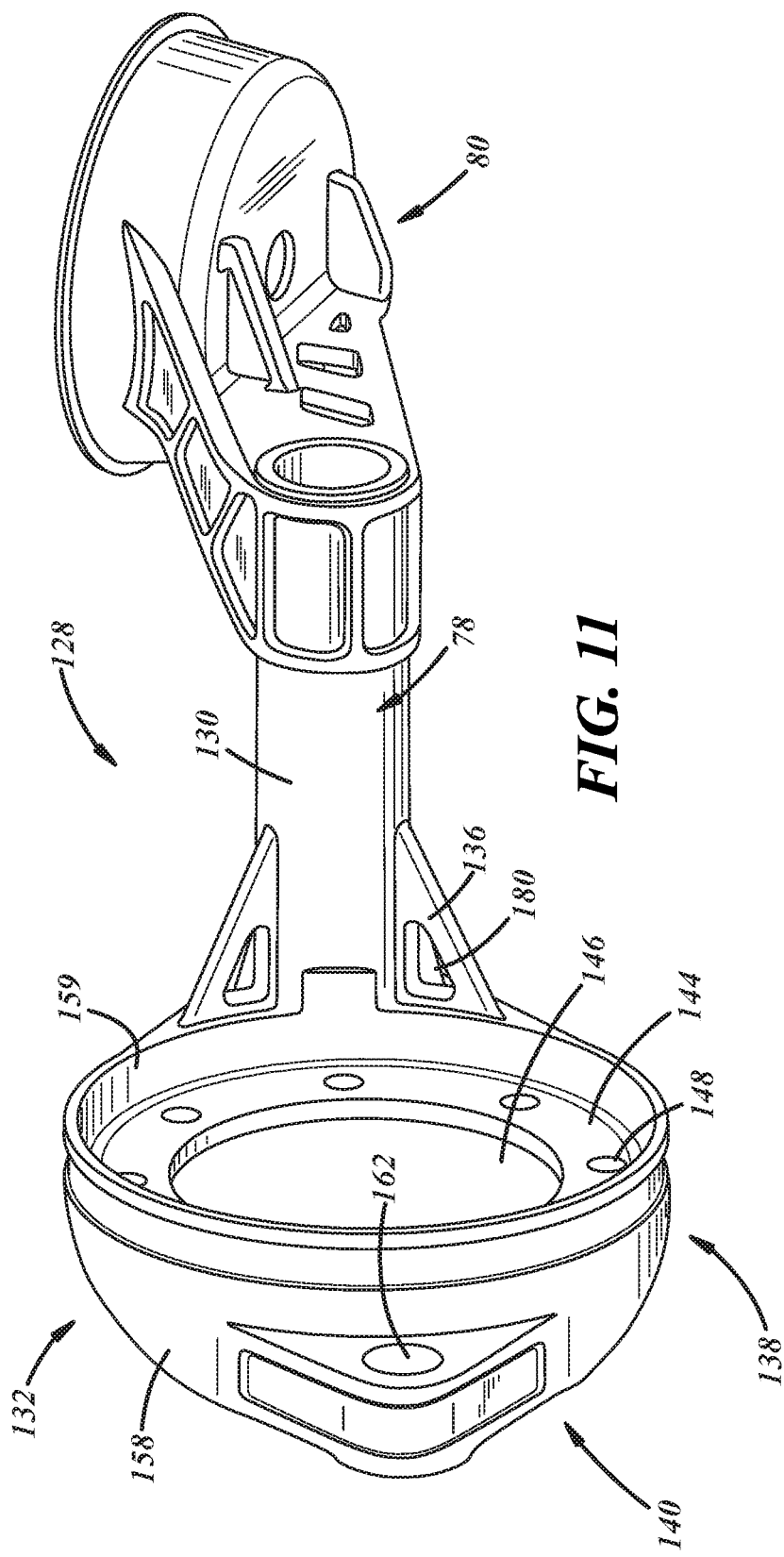

Tube 78 houses camshaft 50 and protects camshaft 50 from external objects and elements. Tube 78 is cylindrical in shape. Referring to FIG. 3, tube 78 is configured to receive bushings 84 in each longitudinal end that are disposed about camshaft 50 and permit rotation of camshaft 50 relative to tube 78. Tube 78 is also configured to receive grease seals 86 in each longitudinal end to prevent loss of lubricating grease from within tube 78. Referring to FIG. 7, in accordance with one aspect of the present teachings, a radially inner surface of tube 78 defines one or more radially inwardly projecting helical ribs 88 and, in particular, circular helical ribs. Ribs 88 provide additional torsional stiffness to tube 78 and bracket 36. Conventional manufacturing methods such as casting and stamping inhibit, or even prohibit, forming tube 78 with ribs 88, but the methods of manufacture disclosed hereinbelow enable formation of a tube 78 including ribs 88. Each rib 88 may terminate before reaching either longitudinal end of tube 78 such that ribs 88 are spaced from the ends of tube 78, thereby enabling tube 78 to receive bushings 84 and seals 86. The pitch of each rib 88 may be greater than the length of tube 78 such that the rib 88 does not completely circle the longitudinal axis 90 of tube 78.

Referring again to FIGS. 4-6, actuator mounting arm 80 is configured to receive and support actuator 70. Arm 80 is disposed at one end of tube 78. Arm 80 may include several portions 92, 94, 96. Portion 92 extends in a generally circumferential direction about tube 78. The thickness of portion 92 may vary depending on the application requirements including anticipated loads. In the illustrate embodiment, portion 92 includes thicker regions at either edge 98, 100 of portion 92 and at spaced struts 102 extending between edges 98, 100 and thinner regions in lands 104 between edges 98, 100 and struts 102. Portion 94 extends in a generally radial direction from tube 78. The thickness of portion 94 may also vary depending on application requirements including anticipated loads. In the illustrated embodiment, portion 94 includes thicker regions at edges 106, 108 of portion 94 and at spaced struts 110 extending between edges 106, 108 and thinner regions in lands 112 between edges 106, 108 and struts 110. In accordance with one aspect of the present teachings, material in one or more lands 112 may be omitted to form weight reduction openings 114. Referring to FIG. 6, portion 94 may include one or more gussets 116 extending between portion 94 and portion 96. Portion 96 is configured to receive actuator 70 and defines an aperture 118 through which pushrod 72 may extend for connection to slack adjuster 74. In accordance with one aspect of the present teachings, portion 96 may comprise the bottom portion of a fluid chamber of actuator 70. The upper portion of the fluid chamber may be joined to portion 96 using conventional methods including crimping. Referring to FIG. 4, portion 96 may define a plurality of circumferentially spaced gussets 120 to provide additional stiffness and rigidity. Although portion 96 is configured to form the bottom portion of a fluid chamber for actuator 70 in the illustrate embodiment, it should be understood that portion 96 may alternatively be formed in a conventional manner to receive a complete actuator 70 with one or more openings configured to receive fasteners extending from or into actuator 70.

Brake spider mounting flange 82 is configured to receive brake spider 38. Flange 82 is disposed at an opposite end of tube 78 relative to actuator mounting arm 80. Flange 82 is substantially trapezoidal in shape in the illustrated embodiment. It should be understood, however, that the configuration of flange 82 may vary depending on the configuration of spider 38. Flange 82 and spider 38 may be attached using various fasteners including bolts, rivets and welds and flange 82 defines bores 122 proximate each "corner" configured to receive the fasteners used to couple spider 38 to flange 82. Flange 82 defines inboard and outboard sides. Flange 82 is configured to receive spider 38 on the outboard side of flange 82. Referring to FIG. 6, one or more gussets 124 may extend from an inboard side of flange 82 to a radially outer surface of tube 78. Referring to FIGS. 4-5, in accordance with one aspect of the present teachings, flange 82 may include one or more weight reduction openings 126 extending from the outboard side of flange 82 facing brake spider 38 to the inboard side of flange 82 facing away from spider 38. Openings 126 are configured to remain empty following assembly of spider 38 to flange 82. Openings 126 may be located symmetrically about axis 90 of tube 78. Like the helical ribs 88 in tube 78, openings 126 would be difficult to form using conventional manufacturing methods for camshaft brackets, but may be formed using the methods described hereinbelow.

Referring now to FIGS. 8-11, another embodiment of a bracket 128 for mounting brake 32 and brake actuator 70 will be described. Like bracket 36, bracket 128 has a unitary or one-piece body 130 such the body 130 is formed without any welds, adhesives, fasteners or other coupling means between portions of body 130. Body 130 may again be made from conventional metals and metal alloys. Portions of body 130 are similar to body 76 of bracket 36. In particular, body 130 defines a camshaft tube 78 and an actuator mounting arm 80 and a description of these portions of body 130 may be found hereinabove. Unlike body 76 of bracket 36, however, body 130 of bracket 128 does not include brake spider mounting flange 82. Instead, body 130 includes a spider 132 and means, such as gussets 134, 136, for supporting spider 132.

Spider 132 is provided to mount the various components of brake 32. Spider 132 includes a mounting portion 138, an anchor pin receiving portion 140, and a camshaft receiving portion 142.

Mounting portion 138 is generally annular in shape and includes a circular section 144 defining a central aperture 146 configured to receive a vehicle axle extending therethrough. Section 144 further defines a plurality of smaller apertures 148 surrounding aperture 146 and configured to receive bolts or other fasteners through which spider 132 may be mounted to a vehicle frame. The thickness of section 144 may vary. In particular, section 144 may be thicker at radially inner and outer edges 150, 152, and struts 154 extending between edges 150, 152. Apertures 148 may be formed through struts 154. Section 144 may be thinner in lands 156 between edges 150, 152 and struts 154 that are subject to lesser loads to reduce the weight of spider 132. Portion 138 may further define a semi-circular contour 158 extending from an outboard side of section 144. Contour 158 varies in axial extent, having the largest axial extent at a circumferential center proximate anchor pin receiving portion 140 and the smallest axial extent at either circumferential end of contour 158. Contour 158 has a shape that is complementary to the shape or radially inner profile of webs 60, 62 of brake shoes 42, 44. One or more gussets 160 may extend between a radially inner surface of contour 158 and an outboard side of section 144 of mounting portion 138. Portion 138 may further define a circular contour 159 extending from an inboard side of section 144.

Anchor pin receiving portion 140 is configured to receive and support anchor pin 40. Portion 140 extends from mounting portion 138 on a diametrically opposite side of mounting portion 138 relative to camshaft receiving portion 142. In particular, portion 140 may extend from contour 158 of mounting portion 138. Portion 140 may be substantially triangular in shape and define a central aperture 162 configured to receive anchor pin 40. The thickness of portion 140 may vary. In particular, portion 140 may be thicker in a region 164 surrounding anchor pin 40 and at the edges 166 of portion 140 and may be thinner in areas 168 between region 164 and edges 166 that are subject to lesser loads to reduce the weight of spider 132. In some embodiments, weight reduction openings may be formed through areas 168 to further reduce the weight of spider 132.

Camshaft receiving portion 142 is configured to receive and support camshaft 50. Portion 142 extends from mounting portion 138 on a diametrically opposite side of mounting portion 138 relative to anchor pin receiving portion 140. Portion 142 may be substantially triangular in shape and define a central aperture 170 configured to receive camshaft 50. The thickness of portion 142 may again vary. In particular, portion 142 may be thicker in a region 172 surrounding camshaft 50 and at the edges 174 of portion 142 and may be thinner in areas 176 between region 172 and edges 174 that are subject to lesser loads to reduce the weight of spider 132. In some embodiments, weight reduction openings may be formed through areas 176 to further reduce the weight of spider 132.

Gussets 134, 136, provide a means for supporting spider 132 relative to tube 78 of bracket 128. Gussets 134, 136 extend between a radially outer surface of tube 78 and an inboard surface of the brake spider 132 and, in particular, an inboard side of camshaft receiving portion 142 of brake spider 132. Gussets 134, 16 are generally triangular in shape and may form right triangles. Gussets 134, 136 have a first side parallel to the radially outer surface of tube 78, a second side parallel to the inboard surface of brake spider 132 and a third side, or hypotenuse, extending from the inboard surface of the brake spider 132 to the radially outer surface of tube 78. In accordance with one aspect of the present teachings, gussets 136 may have one or more weight reduction openings 180 extending therethrough in a generally circumferential direction relative to tube 78. Again, it would be difficult to form openings 180 using traditional manufacturing methods for camshaft brackets such as casting and stamping. Openings 180 may, however, be formed using the manufacturing methods described hereinbelow.

Figure 12:
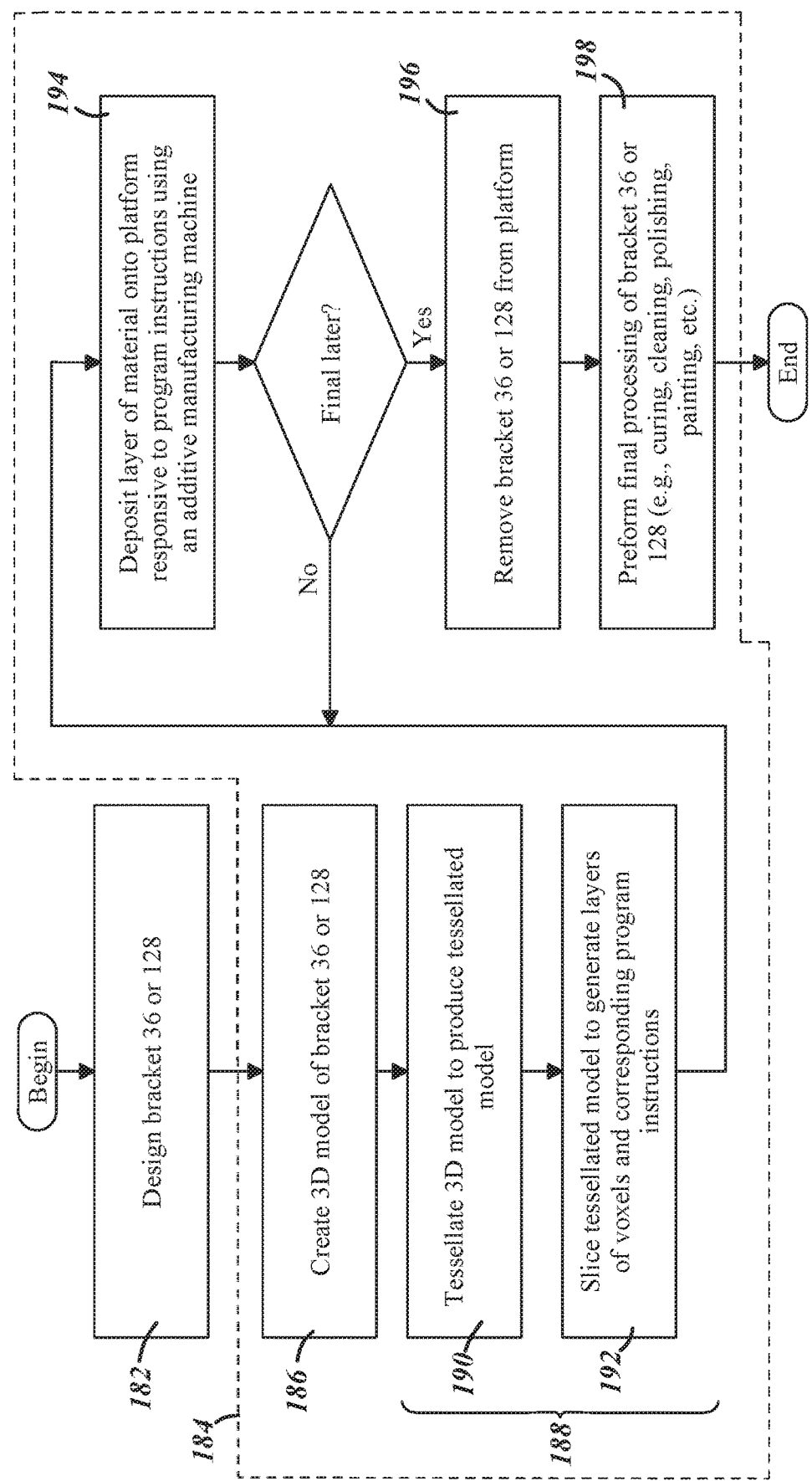
FIG. 12 is a flowchart diagram illustrating steps in a method for manufacturing a bracket for mounting a brake assembly and a brake actuator in accordance with one embodiment of the present teachings.

Referring now to FIG. 12, in accordance with one aspect of the present teachings, a method of manufacturing bracket 36 or 128 may begin with the step 182 of designing a bracket 36 36 or 128. The bracket 36 or 128 includes a tube 78 configured to receive a camshaft 50 of the brake assembly an actuator mounting arm 80 disposed proximate a first end of the tube 76 and configured to receive the brake actuator 70. The bracket 36 further includes a brake spider mounting flange 82 disposed proximate a second end of the tube 78 and configured to receive a brake spider 38 of the brake assembly. The bracket 128 further includes a brake spider 132 disposed proximate a second end of the tube 78, the brake spider 132 defining a central aperture 146 configured to receive an axle and the brakes spider 132 configured to support a pair of brake shoes 42, 44 for a drum brake.

The method may continue with the step 184 of forming the bracket 36 or 128 as a unitary body 76 or 130, respectively, without any welds, adhesives, fasteners or other coupling means between portions of body 76 or 130. In accordance with a preferred embodiment, the forming step 184 may include several substeps to implement an additive manufacturing process. In particular, the forming step 184 may include the substep 186 of creating a three-dimensional model of bracket 36 of 128. The model may be created using computer aided design (CAD) software. In accordance with certain aspects of the present teachings, the thickness of one or more portions of brackets 36, 128 is varied to achieve a predetermined torsional stiffness for bracket 36 or 128 and/or to dampen vibrations at a selected frequency. The method may continue with the step 188 of converting the three-dimensional model into program instructions for an additive manufacturing machine. This step may include several substeps 190, 192 including tessellating the model to produce a stereolithography or standard tessellation language (.STL) file with a tessellated model and slicing the tessellated model into multiple slices or layers of voxels to generate program instructions for the additive manufacturing machine in a numerical control programming language (e.g., G-code). Each of substeps 190, 192 may be performed using conventional software such as the software marketed under the trademark "CADFIX" by International Techne-Group Inc. of Milford, Ohio. Once the program instructions are provided to the additive manufacturing machine, the method may continue with the step 194 of successively depositing layers of material (e.g., metal powder), responsive to the program instructions, using the additive manufacturing machine to form bracket 36 or bracket 128. Bracket 36 or bracket 128 is formed by the machine on a platform and, once the final layer is deposited, the method may continue with the steps 196, 198 of removing bracket 36 or bracket 128 from the platform and, if necessary, performing final processing steps such as curing, cleaning, polishing, painting, etc.

In accordance with another embodiment, the forming step 184 may include several substeps to implement a sand casting process. In particular, the forming step 184 may include the substeps of forming a mold or pattern for the bracket 36 or 128 and placing the mold or pattern within a multi-part container (e.g. a container with two halves). The forming step 184 may further include the substeps of closing the container, placing sand within the container around the mold or pattern, opening the container, removing the mold or pattern from the container, clamping the container shut and pouring material (e.g., molten metal) into the container through a sprue hole and into the cavity in the sand formed by the mold or pattern. The forming step 184 may further include the sub steps of opening the container after the poured material has hardened and cooled, and removing the sand from around the bracket 36 or 128. The forming step 184 may further include machining the bracket 36 or 128 to achieve desired tolerances or surface finishes.

In accordance with another embodiment, the forming step 184 may include several substeps to implement a diecasting process. In particular, the forming step 184 may include the substeps of forming a several molds or dies, joining the molds or dies within a diecasting machine to establish a cavity in the form of bracket 36 or 128, and injecting a material such as a molten metal (e.g., aluminum) into the cavity. The forming step 184 may further include the substeps of separating the molds or dies once the material has hardened and cooled and removing the formed bracket 36 or 128.

In accordance with another embodiment, the forming step 184 may include several substeps to implement an investment casting process. In particular, the forming step 184 may include the substeps of creating a wax pattern of the bracket 36 or 128 and coating the wax pattern with a liquid refractory ceramic material. The forming step 184 may further include the substep of heating the pattern, after the ceramic material has hardened, to melt the wax, leaving a hollow ceramic mold. The forming step 184 may further include the substeps of pouring a material such as a molten metal into the ceramic mold and, once the metal solidifies into a metal casting of the bracket 36 or 128, breaking the ceramic mold to retrieve the metal casting.

In accordance with another aspect of the present teachings, the above-described methods may be used to manufacture a plurality of different brackets for mounting brake assemblies and brake actuators having the same torsional stiffness. In particular, two brackets 36 or 128 that are identical except for having a different length along axis 90 of tube 78 would normally have a different torsional stiffness. By varying the material thickness of portions of the brackets 36 or 128, however, the two brackets 36 or 128 can be designed to have the same torsional stiffness despite the difference in length. Thus, a method of manufacturing a plurality of different brackets 36 or 128 for mounting brake assemblies and brake actuators may again begin with the step 182 of designing two or more brackets 36 or 128 with each bracket 36 or 128 including a tube 78 configured to receive a camshaft 50 of the brake assembly, an actuator mounting arm 80 disposed proximate a first end of the tube 76 and configured to receive the brake actuator 70 and either a brake spider mounting flange 82 disposed proximate a second end of the tube 78 and configured to receive a brake spider 38 of the brake assembly (in the case of brackets 36) or a brake spider 132 disposed proximate a second end of the tube 78, the brake spider 132 defining a central aperture 146 configured to receive an axle and the brakes spider 132 configured to support a pair of brake shoes 42, 44 for a drum brake (in the case of brackets 128). In accordance with one aspect of the present teachings, the material thickness of corresponding portions of the brackets 36 or brackets 128 is varied to achieve the same predetermined torsional stiffness despite differences in the length of the tubes 78 in the brackets 36 or 128. For example, the thickness of corresponding portions of the tubes 78 of the two brackets 36, 128 may be varied, the width and/or depth of corresponding ribs 88 in the tubes 78 may be varied, or exterior ribs added to tubes 78. The method may again conclude with the step 184 of forming each of the brackets 36 or 128 as a unitary body. The forming step 184 may be performed using any of the additive manufacturing, sand casting, die casting or investment casting methods described hereinabove.

A bracket 36 or 128 for mounting a brake assembly 32 and a brake actuator 70 in accordance with the invention represents an improvement as compared to conventional bracket assemblies. In particular, the absence of welds and other joints enables use of the bracket 36 or 128 without supports 26 extending between the axle 28 and bracket 36 or 128 thereby simplifying vehicle assembly and reducing costs. The absence of welds and other joints also reduces potential failures in the bracket 36 or 128 and misalignment of brake components. The bracket 36 or 128 can also be made with lighter materials and without costly tooling. The bracket 36 or 128 can also be manufactured in a manner that provides flexibility in accommodating different application requirements including loads, mounting hole patterns, available space, varying camshaft lengths and varying brake actuator positions as well as in addressing noise and vibration from natural frequencies of the assembly. The bracket 36 or 128 can also be manufactured in a manner that establishes a desired torsional stiffness (particularly among brackets of different lengths) thereby reducing the requirements on slack adjusters 74 to accommodate large ranges of deflection and making it easier to set a proper running clearance between the brake shoes 42, 44 and brake drum.

While the invention has been shown and described with reference to one or more particular embodiments thereof, it will be understood by those of skill in the art that various changes and modifications can be made without departing from the spirit and scope of the invention.

What is claimed is:

1. A bracket for mounting a brake assembly and a brake actuator, comprising:
    a unitary body including
        a tube configured to receive a camshaft of the brake assembly;
        an actuator mounting arm disposed proximate a first end of the tube, the actuator mounting arm configured to receive the brake actuator; and,
        a brake spider mounting flange disposed proximate a second end of the tube, the brake spider mounting flange configured to receive a brake spider of the brake assembly
    wherein a radially inner surface of the tube defines at least one radially inwardly projecting helical rib.

2. The bracket of claim 1 wherein the radially inner surface of the tube defines a plurality of radially inwardly projecting helical ribs.

3. The bracket of claim 1 wherein first and second ends of the at least one radially inwardly projecting helical rib are spaced from corresponding first and second ends of the tube.

4. The bracket of claim 1 wherein the at least one radially inwardly projecting helical rib comprises a circular helical rib.

5. The bracket of claim 1 wherein a pitch of the at least one radially inwardly projecting helical rib is greater than a length of the tube.

6. A bracket for mounting a brake assembly and a brake actuator, comprising:
    a unitary body including
        a tube configured to receive a camshaft of the brake assembly;

an actuator mounting arm disposed proximate a first end of the tube, the actuator mounting arm configured to receive the brake actuator; and, a brake spider disposed proximate a second end of the tube, the brake spider defining a central aperture configured to receive an axle and configured to support a pair of brake shoes for a drum brake wherein a radially inner surface of the tube defines at least one radially inwardly projecting helical rib.

7. The bracket of claim 6 wherein the radially inner surface of the tube defines a plurality of radially inwardly projecting helical ribs.

8. The bracket of claim 6 wherein first and second ends of the at least one radially inwardly projecting helical rib are spaced from corresponding first and second ends of the tube.

9. The bracket of claim 6 wherein the at least one radially inwardly projecting helical rib comprises a circular helical rib.

10. The bracket of claim 6 wherein a pitch of the at least one radially inwardly projecting helical rib is greater than a length of the tube.

11. The bracket of claim 6 wherein the unitary body further includes at least one gusset extending between a radially outer surface of the tube and an inboard surface of the brake spider, the at least one gusset including at least one weight reduction opening extending therethrough.

12. The bracket of claim 11 wherein the unitary body includes a plurality of gussets, each gusset of the plurality of gussets extending between the radially outer surface of the tube and the inboard surface of the brake spider and including at least one weight reduction opening extending therethrough.

13. A method of manufacturing a plurality of different brackets for mounting a brake assembly and a brake actuator, comprising:

creating three-dimensional models of a first bracket having a first length and a second bracket having a second length different than the first length;

converting the three-dimensional models into program instructions for an additive manufacturing machine; and, successively depositing layers of material, responsive to the program instructions, using the additive manufacturing machine to form the first bracket and the second bracket, each of the first bracket and the second bracket comprising a unitary body defining a tube configured to receive a camshaft of the brake assembly; and, an actuator mounting arm disposed proximate a first end of the tube, the actuator mounting arm configured to receive the brake actuator wherein the first bracket and the second bracket are configured to have the same torsional stiffness.

14. The method of manufacture of claim 13 wherein a radially inner surface of the tube defines at least one radially inwardly projecting helical rib.

15. The method of manufacture of claim 13 wherein the unitary body further defines a brake spider mounting flange disposed proximate a first end of the tube, the brake spider mounting flange configured to receive a brake spider of the brake assembly.

16. The method of manufacture of claim 15 wherein the brake spider mounting flange includes at least one weight reduction opening extending from a first side of the brake spider mounting flange facing the brake spider to a second side of the brake spider mounting flange facing away from the brake spider, the at least one weight reduction opening configured to remain empty following assembly of the brake spider to the brake spider mounting flange.

17. The method of manufacture of claim 13 wherein the unitary body further defines a brake spider disposed proximate a second end of the tube, the brake spider defining a central aperture configured to receive an axle and the brake spider configured to support a pair of brake shoes for a drum brake.

18. The method of manufacture of claim 17 wherein the unitary body further includes at least one gusset extending between a radially outer surface of the tube and an inboard surface of the brake spider, the at least one gusset including at least one weight reduction opening extending therethrough.

19. The method of manufacture of claim 13 wherein the unitary body is configured to attenuate a predetermined natural frequency.

* * * * *